Aug. 11, 1953  R. C. HENSHAW  2,648,509
VIBRATION CONTROLLER FOR A RESILIENT MOUNTING
Filed April 17, 1947
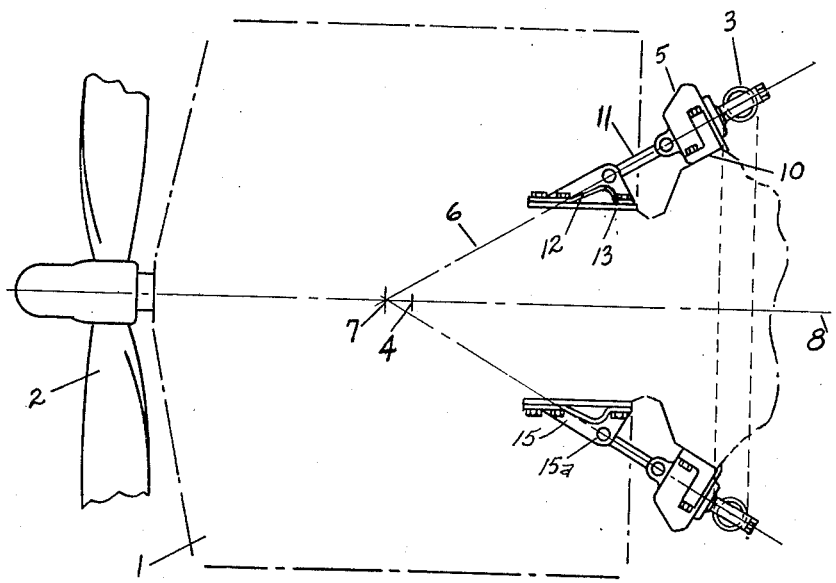
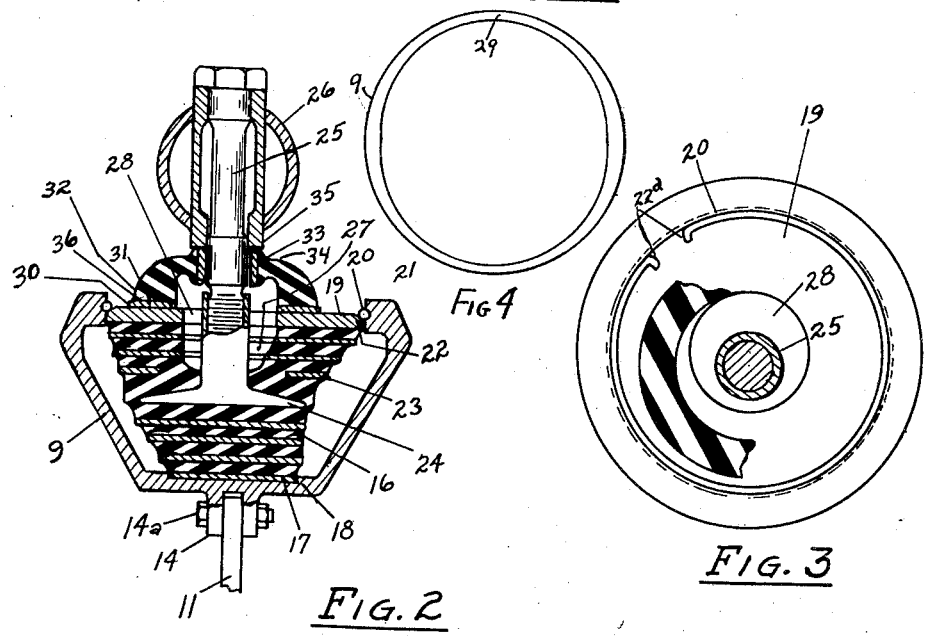
Inventor
Richard C Henshaw
By
Ralph Hammar
Attorney Patented Aug. 11, 1953

2,648,509

UNITED STATES PATENT OFFICE 2,648,509

VIBRATION CONTROLLER FOR A RESILIENT MOUNTING

Richard C. Henshaw, Erie, Pa., assignor to Lord Manufacturing Company, Erie, Pa., a corporation of Pennsylvania Application April 17, 1947, Serial No. 741,963

2 Claims. (Cl. 248—5)

Airplane engines have been supported in overhung relation to an engine ring by pedestal mounts arranged around the torque axis. Each of the mounts has a shear sandwich mounting arranged so the direction of shear response is generally tangent to arcs centered on the torque axis and the direction of compression and tension response (direct stress) is along axes converging toward the torque axis in the region (usually in front) of the center of gravity of the engine.

This invention is intended to improve the pedestal mount by a load distributing engine attaching structure and by an improved friction damper responding only to large amplitude vibrations and substantially unaffected by thrust loads. Another advantage of the attaching structure is the ease of removal and replacement of individual mounts. Further objects appear in the specification and claims.

In the accompanying drawing, Fig. 1 is a side elevation of a typical installation, Fig. 2 is an enlarged section through a mounting, Fig. 3 is an end view of the mounting, partly broken away, and Fig. 4 is a diagrammatic view illustrating the machining of the housing to give greater clearance in the torque direction.

Referring to the drawing, 1 indicates a multiple row radial engine, 2 a propeller carried by the engine, 3 an engine ring suitably supported by the air frame, 4 the center of gravity of the engine (the engine and parts carried thereby) and 5 mountings supporting the engine on the engine ring. The mountings are focused along axes 6 to a point 7 on the torque axis 8, the point 7 being sufficiently forward of the center of gravity 4 to produce an effective virtual suspension of the engine at the center of gravity 4.

Each of the mountings comprises a housing 9 bolted to a pad 10 on the engine and connected by a strut 11 to a bracket 12 also bolted solidly to pads 13 on the engine. The strut has eyes at each end received in clevises 14 and 15 on the housing and bracket.

The jointed structure provided by the removable strut simplifies the machining of the engine pads 10 and 13 and the mating surfaces on the housing 9 and bracket 12. The ability to disconnect the strut by removal of the clevises bolts 14a and 15a facilitates the replacement of individual housing units.

Within each housing is a rubber core 16 having one end bonded to a metal disk 17 seated in a recess 18 in the bottom of the housing and the other end bonded to an annular metal cover 19 held in the housing by a snap ring 20 partially seated in a groove 21 in the cover and projecting inwardly against a shoulder 22 on the cover. The core is normally compressed between the cover and the bottom of the housing producing a wedging action on the snap ring which keeps the snap ring securely in place. The core may be readily removed by first compressing the core against the bottom of the housing to relieve the pressure on the snap ring and then squeezing ears 22a to move the snap ring out of the groove 21. As is customary in this type of mounting, there are embedded metal plates 23 parallel to the cover 19 and to a mushroom head 24 on a stem 25 extending through and bolted to an engine ring bushing 26. The plates stiffen the rubber in compression without affecting the resistance in shear so as to better support the overhung weight. The stem extends out through a recess 27 and an opening 28 in the cover, the stem being offset so as to assume a central position under normal torque. The normal torque also brings the core to a more nearly symmetrical or centered position.

Bottoming of the mushroom head against the side walls of the housing 9 under extreme torque is prevented by machining the side walls by a circular cutter offset in the direction of movement under torque first on one and then on the other side of the center of the housing. This thins the housing side walls at the regions 29 of greatest strength and provides the desirable added clearance at no expense to over-all strength. In effect the inner wall of the housing is oval in the direction of torque deflection while the outer wall is circular.

During idling or shock induced resonance, there is a tendency toward excessive shear deflection which is prevented by a friction damper comprising an annular metal end plate 30 bonded to the rim 31 of a cup shaped rubber member 32 and held against the cover 19 by a tubuular sleeve 33 bonded in the bottom wall 34 of the rubber member and having its outer end 35 engaging the engine ring bushing 26. The bottom 34 is initially stressed in shear sufficient to maintain contact between the end plate 30 and the cover 19. The side walls 36 of the cup members yield in shear under lateral movement of the sleeve 33 relative to the end plate 30. When this relative lateral movement produces a stress greater than the friction force between the end plate and cover, the end plate slides on the cover introducing friction damping. This damping is not present at small amplitude vibrations, which only result in a shear deflection of the walls 36 but is delayed until larger amplitude vibrations are encountered and result in excessive relative vibratory movement between the stem 25 and the housing 9 in any direction transverse to the stem. Because there is no friction damping under normal conditions, there is normally less transmission of vibration from the engine to the engine ring and air frame. The cup shape of the rubber prevents unseating of the end plate 30 with the resultant elimination of all possibility of damping.

What I claim as new is:

1. In a resilient mounting having a member subject to vibration edgewise of a surface thereon, a vibration controller comprising a friction plate slidable edgewise on the surface, and a cup shaped member of rubber or equivalent resilient material having its rim connected to the plate and the center of its bottom wall provided with a pressure transmitting connection radially inward of the side walls of the cup urging the plate against the surface, the bottom wall of the cup yielding in shear direction normal to the plate to maintain friction contact of the plate and surface and the side walls of the cup yielding in shear in a direction edgewise of the plate to permit limited movement of the plate with the surface without sliding relative to the surface until the stress in the sidewalls of the cup exceeds the friction force on the plate.

2. In a resilient mounting having a member subject to vibration edgewise of a surface thereon, a vibration controller comprising a friction plate slidable edgewise on the surface, and resilient means holding the friction plate against the surface including a section of rubber or equivalent resilient material yieldable in shear in a direction toward and away from the surface and another section of rubber or equivalent resilient material connected to the first section and yieldable in shear in a direction edgewise along the surface, said first section exerting a force normal to the plate maintaining the friction contact of the plate with the surface and said other section permitting limited movement of the plate with the surface without sliding relative to the surface so long as the stress in said other section is less than the friction force on the plate.

RICHARD C. HENSHAW.

References Cited in the file of this patent

UNITED STATES PATENTS

| Number | Name | Date |
|---|---|---|
| 1,648,061 | Royce | Nov. 8, 1927 |
| 2,243,660 | Thomson | May 27, 1941 |
| 2,271,016 | Julien | Jan. 27, 1942 |
| 2,287,316 | Lord | June 23, 1942 |
| 2,317,501 | Tyler | Apr. 27, 1943 |
| 2,355,829 | Tyler | Aug. 15, 1944 |
| 2,382,373 | Lord | Aug. 14, 1945 |
| 2,477,501 | Tyler et al. | July 26, 1949 |